United States Patent [19]
Hansen

[11] Patent Number: 5,029,170
[45] Date of Patent: Jul. 2, 1991

[54] ASSEMBLY LANGUAGE PROGRAMMING POTENTIAL ERROR DETECTION SCHEME WHICH RECOGNIZES INCORRECT SYMBOLIC OR LITERAL ADDRESS CONSTRUCTS

[76] Inventor: Robert G. Hansen, 12230 N. 25th Ave., Phoenix, Ariz. 85029

[21] Appl. No.: 443,420

[22] Filed: Nov. 30, 1989

[51] Int. Cl.$^5$ .................. G06F 9/44; G06F 9/455
[52] U.S. Cl. .................. 371/19; 371/23; 364/200
[58] Field of Search .................. 371/19, 23

[56] References Cited

U.S. PATENT DOCUMENTS

| | | | |
|---|---|---|---|
| 4,730,315 | 3/1988 | Saito et al. | 371/19 |
| 4,841,434 | 6/1989 | Mathewes, Jr. et al. | 364/200 |
| 4,953,084 | 8/1990 | Meloy et al. | 364/200 |

FOREIGN PATENT DOCUMENTS 0019241  1/1985  Japan .................. 371/19

OTHER PUBLICATIONS

Cocking et al., Software Device Simulator, IBM TDB, vol. 15, No. 9, Feb. 1973.
Cocking et al., Software Tester, IBM TDB, vol. 15, No. 9, Feb. 1973.
Flanagan, Program Debugging System, IBM TDB, vol. 16, No. 7, Dec. 1973.

*Primary Examiner*—Jerry Smith
*Assistant Examiner*—Russell E. Cass
*Attorney, Agent, or Firm*—J. S. Solakian; J. H. Phillips

[57] ABSTRACT

A computer aided software engineering tool is disclosed which is particularly well adapted to identify potential Assembly language source code errors resulting from incorrectly used symbolic and literal address constructs. This objective is achieved by providing a debugging program which has a complete awareness of the specific machine interfaces, conventions and symbol sets. By essentially stepping through the Assembly language statements (without regard to neighboring statements), the debugging program is able, through such examination, to identify, in the Assembly language program under study, specific instances of the use of statements containing possibly incorrect symbolic or literal address constructs and to run closely related additional tests. The programmer may then examine the denoted Assembly language code to determine if a genuine error exists.

8 Claims, 2 Drawing Sheets

ASSEMBLY LANGUAGE PROGRAMMING POTENTIAL ERROR DETECTION SCHEME WHICH RECOGNIZES INCORRECT SYMBOLIC OR LITERAL ADDRESS CONSTRUCTS

FIELD OF THE INVENTION

This invention relates to the art of computer programming and, more particularly, to a debugging software engineering tool particularly adapted to detect incorrect symbolic or literal address constructs in statements which are syntactically valid; i.e., in statements which do not contain any errors of the type which can be generally categorized as incorrect usage.

REFERENCE TO MICROFICHE APPENDIX

For a complete listing (in C) of the computer program constituting the present invention, one may refer to the Microfiche Appendix filed with copending U.S. patent application Ser. No. 07/443,680, entitled ASSEMBLY LANGUAGE PROGRAMMING POTENTIAL ERROR DETECTION SCHEME SENSING APPARENT INCONSISTENCY WITH A PREVIOUS OPERATION by Robert G. Hansen, filed on even date herewith, which Microfiche Appendix includes one (1) Microfiche plate containing ninety-five (95) total frames (including a test pattern), and which Microfiche Appendix is incorporated by reference herein.

BACKGROUND OF THE INVENTION

As those skilled in the art well understand, computer programming is rarely performed directly in machine language. Instead, programming is usually carried out in higher language form such as C, BASIC, FORTRAN, COBOL, PASCAL, etc. In the case of BASIC, a resultant "source" program can then be executed employing a machine resident interpreter program which reads the individual source code programming statements and converts them to machine instructions (appropriate for the hardware being used) on a statement by statement basis. This is a relatively slow process, however, and more efficient and very much faster execution of a BASIC program can be obtained by first processing it through a compiler program specifically created to prepare executable or "object" code in an optimum sequence for a given type of hardware. Compilation is routinely carried out (in fact, is required) even during the programming and program proving tasks for many of the high level programs such as C.

Some programmers prefer to work in a less high level, more machine specific, language designated "Assembly" which is readily reduced to machine level instructions with an "Assembler" program in an operation similar to, but much more straightforward than, compilation. The resultant object code is very efficient. However, because Assembly is a low level language, it is notoriously easy, during the coding process, to introduce subtle programming errors (or "bugs") which the Assembler will not catch and which may be particularly elusive to identify and remedy during the program proof (or "debugging") process.

One class of errors of this elusive sort are those in which an Assembly language statement is entirely legal in that syntax, limits, specification of operands, etc. are all properly incorporated, but the correctly configured statement nonetheless employs symbolic or literal address constructs which would (or might) result in incorrect address generation if the statement were executed. It is to the early detection of elusive programming errors of this class and certain additional closely related errors that the present invention is directed.

OBJECTS OF THE INVENTION

It is therefore a broad object of this invention to provide an improved debugging tool for analyzing the source of computer programs written in Assembly language.

It is a more specific object of this invention to provide an Assembly language debugging program including a module which senses the possible presence of incorrect symbolic or literal address constructs and possible related errors in a statement which is syntactically valid.

SUMMARY OF THE INVENTION

Briefly, these and other objects of the invention are achieved by providing a debugging program which has a complete awareness of the specific machine software interfaces, conventions and symbol sets. By essentially stepping through the Assembly language statements (without regard to neighboring statements), the debugging program is able, through such examination, to identify, in the Assembly language program under study, specific instances of the use of statements containing possibly incorrect symbolic or literal address constructs and to run closely related additional tests. The programmer may then examine the denoted Assembly language code to determine if a genuine error exists.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
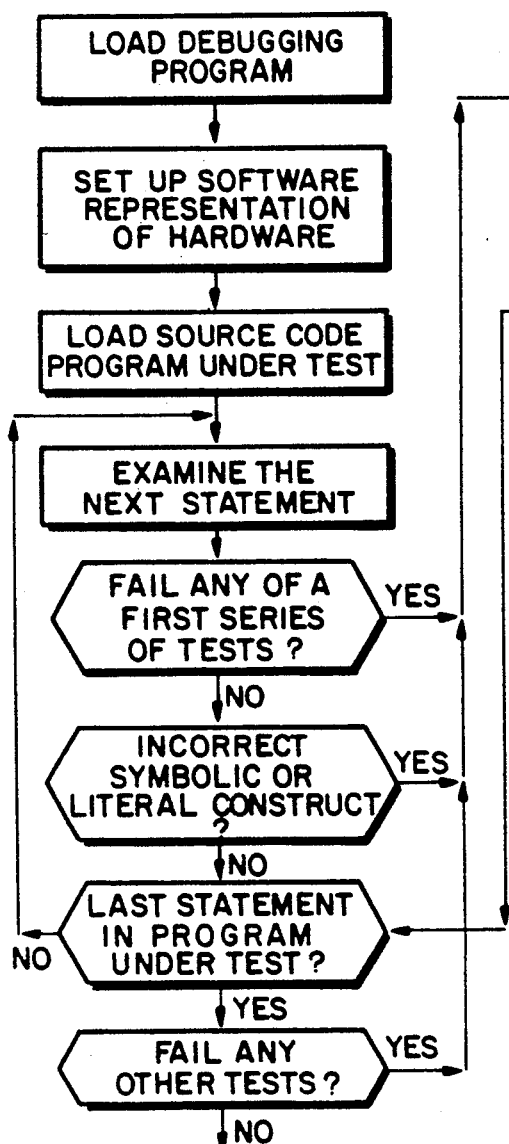
FIG. 1 is a high level flow chart illustrating the general sequence of a debugging program in which the present invention may be incorporated.

Attention is first directed to FIG. 1 which is a high level flow chart illustrating the general sequence of an Assembly language debugging program of the present class. As a first step in setting up the debugging procedure, certain essential aspects of the architecture of the machine for which object code is to be generated is represented in software in a manner well known to those skilled in the art. Briefly, merely as an elementary example, consider a case in which a statement address is specified as a decimal literal. Now, if the operation called for is Boolean and the literal contains contiguous sevens, an octal (rather than decimal) literal is probably intended notwithstanding completely correct syntax, etc. of all the relevant source code.

For an example of the manner in which the architectural characteristics of hardware employing the Bull HN Information Systems Inc. GCOS 8 operating system may be represented, one may refer to pages 2-54 of the aforementioned Microfiche Appendix.

Various tests can be conducted on a step by step basis as an Assembly language source code program under test is examined and analyzed, and failure of any of the tests can result in the issuance of an appropriate error or warning message for the benefit of the programmer. The present invention, however, relates to a series of related tests, directed to the early detection of statements which contain symbolic or literal constructs which may be incorrect, in a stand alone module of the debugging program which is represented in FIG. 1 by the inquiry block: "INCORRECT SYMBOLIC OR LITERAL CONSTRUCT?". It is convenient to run certain other related tests pertaining to address construction in the same module, and these related tests are also discussed below and deemed a subset of the subject invention. Following completion of the subject battery of tests, any other tests remaining in the debugging program may be run to conclude the testing of the source code program or program module.

Families of globally defined symbols are used by certain computer systems in the development of addresses. A given family of symbols is typically associated with a particular data structure and is uniquely identified by a prefix which might be one to three characters in length. For example, all symbols referring to the system communication region might thus have a prefix of ".CR" such that the symbol ".CRNPC" would be known to be associated with system communications. Furthermore, a special type of symbolic modifier is typically used to reference a system data structure. Such modifiers constitute another family of symbols identified by a prefix, say, of "P.". Thus, for example, the symbol "P.CR" is always used to reference a ".CR" communication region symbol. Consequently, the appearance in a source statement of one symbol without the other would likely be an error.

The subject debugging program has a total awareness of all families of global symbols and of every symbol within each family. In addition, the symbolic modifier which is used in conjunction with a given symbol reference is known. This information, augmented by knowledge of the hardware architecture, permits each Assembly language source statement which references a system symbol to be analyzed for correctness; e.g., insuring that the proper modifier has been used in conjunction with the symbol. Additional tests are performed on each source statement to insure consistency and reasonableness as follows:

1. Address field expressions are evaluated to insure the value does not exceed the maximum value which can be represented in the address field of an instruction word.

2. Literals are examined in the context of their usage. For example, a decimal literal with two or more contiguous zeros or sevens which is being used for a Boolean operation was probably intended to be an octal literal.

3. The required interfaces for calls to other modules are known. This includes (a) the requirement to pass information to the callee in special registers, (b) call impermissible due to wrong execution environment, and (c) the callee uses an alternate return for error conditions. A call statement which violates any of these conditions will be denoted.

4. Certain machine instructions are usable only in certain environments, and instructions not suited to the environment specified will be denoted.

Figure 2B:
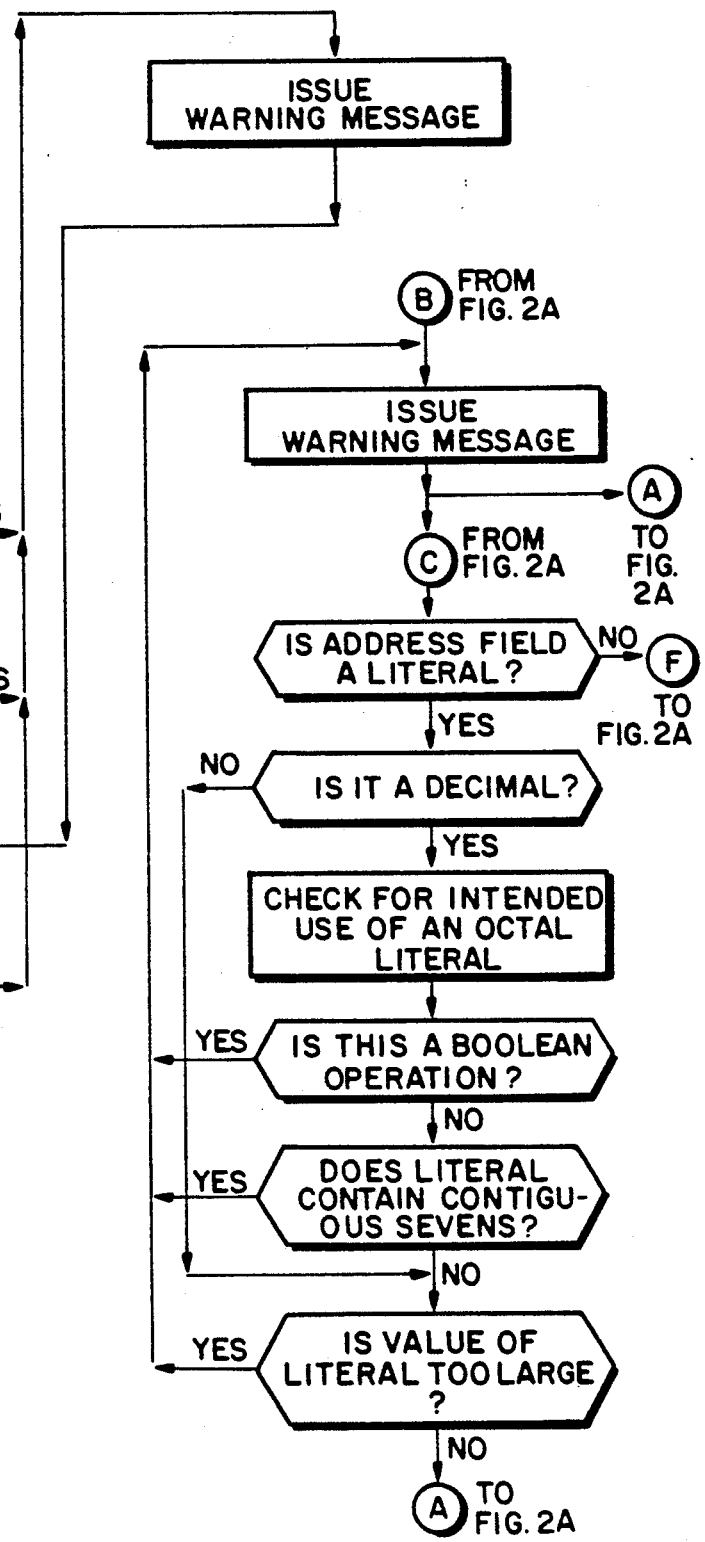
FIG. 2, constituting FIG. 2A and FIG. 2B taken together, is a more detailed flow chart disclosing the structure of the debugging module in which the present invention is incorporated.
Figure 2A:
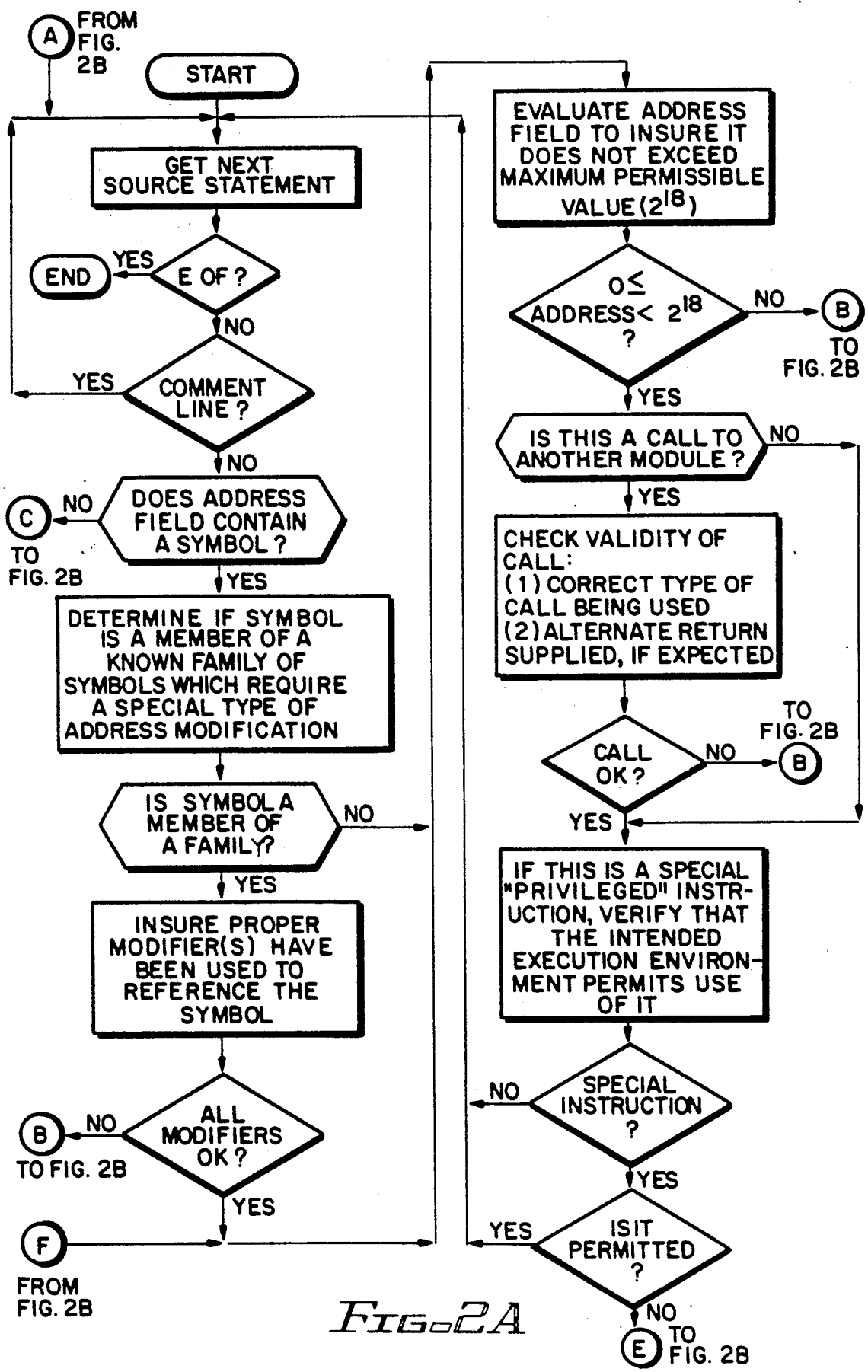

Attention is now directed to FIG. 2 (i.e., FIGS. 2A and 2B taken together) which is a detailed flow chart disclosing the operation of the subject Assembly language source code test module in which early detection of apparently incorrect symbolic or literal address constructs and related potential problems is achieved.

Thus, starting from the beginning of the Assembly source code program or program module under examination, the next statement is called for analysis at point A. If it is an end-of-file statement, an exit is made to the next series of tests; if not, a determination is made as to whether it is a mere comment (which need not be analyzed). If it is a comment, the next statement is called; if not, the analysis proceeds on the merits.

The first inquiry on the merits is whether the address field of the instruction represented by a statement under examination contains a symbol. If not, an inquiry is made as to whether the address field contains a literal. If not, the analysis of the statement may proceed to the supplementary tests starting at point F.

The first supplementary test determines if the size of the address field expression does not exceed a predetermined maximum ($2^{18}-1$ in the example). If the maximum is exceeded, flow is redirected to point B, a warning message is issued, and flow returns to point A to fetch the next statement to be examined. If the maximum is not exceeded, flow continues to the next supplementary test which begins with a determination as to whether a call to another module is involved. If so, the validity of the call is checked by determining if the correct type of call is being used and if an alternate return is supplied, if expected. Failure of either test redirects flow to point B to issue a warning message. If the statement does not involve a call to another module or if it does and the call to another module was correctly stated, the final supplementary test is undertaken.

The final supplementary test relates to whether the instruction is "privileged" and if so, whether the intended execution environment permits its use. (Certain instructions are privileged in that they may only be used by the operating system or its ancillary functions. Such instructions are used to control I/O and other special hardware functions.) If the instruction corresponding to the statement under examination is not privileged, or if it is, but the use is proper in the execution environment, flow returns to step A to fetch the next statement for analysis. If it is a privileged instruction which is not permitted in the application program execution environment, flow is redirected to point B to issue a warning message and proceed to the next statement for analysis.

Attention is now directed again to the first inquiry on the merits; i.e., whether the address field contain a symbol. If it does, a determination is made as to whether the symbol is a member of a family of symbols. If not, flow proceeds to the supplementary tests described above. If so, an inquiry is made as to whether proper modifier(s) have been used to reference the symbol. If so, flow is directed to the supplementary tests; if not, flow is redirected to point B to issue a warning message and proceed to the next statement.

As previously noted, if the address field does not contain a symbol, the next inquiry, beginning at point C, is whether the address field is a literal. If not, as previously noted, the supplementary tests are conducted. If so, an inquiry is made as to whether the address field is a decimal literal. If not, an inquiry is made to determine if the literal is larger than can be accommodated in a machine word address field. If not, flow is returned to point A to call the next statement for examination. If so, flow is redirected to point B to issue a warning message and then examine the next statement.

If the address field is a decimal literal, then a test is undertaken to determine if the intent may have been to specify an octal literal. An inquiry is made as to whether a Boolean operation is called for. If so, there is clear intent to use an octal literal, and flow is redirected to point B to issue a warning message and proceed to the next statement. If the called for operation is not Boolean, a secondary inquiry is made as to whether the literal contains contiguous zeros or sevens. If so, the possibility of an intent to use an octal literal is substantial, and flow is redirected to point B to issue a warning message and proceed to the next statement. If not, flow passes to the previously described test pertaining to the size of the literal.

According to the embodiment of the subject invention shown in FIG. 2, in each case of the issuance of a warning message, the debugging program continues right on through the entire Assembly language source code program or program module under examination, the next statement can be called up for analysis as indicated in FIG. 2. Thus, the entire group of warning messages can be reviewed as a group, recognizing that there may be interrelationships among the bugs or possible bugs, for revision of the source code as may be appropriate. Alternatively, those skilled in the art will understand that the debugging program could be readily revised such that its execution can be made to terminate after each warning message is issued such that the "earliest remaining" bug or potential bug of the sort detectable by the subject program can be addressed by the programmer. Experience has shown, however, that the mode of operation shown in FIG. 2 is preferable.

For a detailed specific listing of a debugging program incorporating the subject invention, one may refer to pages 55-94 of the aforementioned Microfiche Appendix.

Thus, while the principles of the invention have now been made clear in an illustrative embodiment, there will be immediately obvious to those skilled in the art many modifications of program structure used in the practice of the invention which are particularly adapted for specific environments and operating requirements without departing from those principles.

What is claimed is:

1. A computer aided software engineering process adapted to identify potential source code errors by the analysis of Assembly language statements, the process including the steps of:
   A) establishing, in the computer system with which the program in development is being debugged, a software representation of the architecture of the computer system upon which the program in development will be eventually used;
   B) loading the first statement of the program in development for analysis;
   C) examining the statement to determine if the address field of the corresponding instruction contains a symbolic address construct;
   D) if the result of step C is:
      1) that the instruction does contain a symbolic address construct, going to step E;
      2) that the instruction does not contain a symbolic address construct, going to step I;
   E) determining if the symbol is a member of a family of symbols which require a special type of address modification;
   F) if the result of step E is:
      1) that the symbol is a member of a family of symbols which require a special type of address modification, going to step G;
      2) that the symbol is not a member of a family of symbols which require a special type of address modification, going to step J;
   G) determining whether proper modifiers have been used to reference the symbol;
   H) if the result of step G is:
      1) that proper modifiers have been used to reference the symbol, going to step J;
      2) that improper modifiers have been used to reference the symbol, issuing a warning message and then going to step K;
   I) conducting any literal address field tests provided for analyzing the loaded statement;
   J) conducting any supplementary tests provided for analyzing the loaded statement;
   K) loading the next statement of the program in development for analysis, and proceeding to step C.

2. The computer aided software engineering process of claim 1 which includes, in step I, the substeps of:
   Ia) determining if the address field is a literal;
   Ib) if the results of step Ia is:
      Ib1) that the address field is a literal, going to step Ic;
      Ib2) that the address field is not a literal, going to step J;
   Ic) determining if the literal address field is a decimal;
   Id) if the results of step Ic is:
      Id1) that the literal address field is a decimal, going to step Ig;
      Id2) that the literal address field is not a decimal, going to step Ie;
   Ie) determining if the literal is larger than can be accommodated in a machine word address field;
   If) if the results of step Ie is:
      If1) that the literal is larger than can be accommodated in a machine word address field, issuing a warning message and then going to step K;
      If2) that the literal is not larger than can be accommodated in a machine word address field, going to step K;
   Ig) determining if the called for operation is Boolean;
   Ih) if the results of step Ig is:
      Ih1) that the called for operation is Boolean, issuing a warning message and then going to step K;
      Ih2) that the called for operation is not Boolean, going to step Ij;
   Ij) determining if the literal contains contiguous sevens;
   Ik) if the results of step Ij is:
      Ik1) that the literal contains contiguous sevens, issuing a warning message and then going to step K;
      Ik2) that the literal does not contain contiguous sevens, going to step Ie.

3. The computer aided software engineering process of claim 2 which further includes, in step J, the substeps of:
   J1a) determining if the address field does not exceed a predetermined maximum value;
   J1b) if the result of stem J1a is:

J1b1) that the address field exceeds a predetermined maximum value, issuing a warning message and then going to step K;

J1b2) that the address field does not exceed a predetermined maximum value, continuing with any remaining literal address field tests provided in step J for analyzing the loaded statement.

4. The computer aided software engineering process of claim 2 which further includes, in step J, the substeps of:

J2a) determining if the specified operation is a call to another module;

J2b) if the result of step J1a is:

J2b1) that the specified operation is a call to another module, going to step J2c;

J2b2) that the specified operation is not a call to another module, continuing with any remaining literal address field tests provided in step J for analyzing the loaded statement;

J2c) determine the validity of the call;

J2d) if the result of step J2c is:

J2c1) that the call is valid, continuing with any remaining literal address field tests provided in step J for analyzing the loaded statement;

J2c2, that the call is invalid, issuing a warning message and then going to step K.

5. The computer aided software engineering process of claim 2 which further includes, in step J, the substeps of:

J3a) determining if the statement invokes a privileged instruction;

J3b) if the result of step J3a is:

J3b1) that the statement does not invoke a privileged instruction, continuing with any remaining literal address field tests provided in step J for analyzing the loaded statement;

J3b2) that the statement dose invoke a privileged instruction, going to step J3c;

J3c) determining if intended execution environment permits use of the privileged instruction;

J3c1) if the intended execution environment does not permit use of the privileged instruction, issuing a warning message and going to step K;

J3c2) if the intended execution environment permits use of the privileged instruction, continuing with any remaining literal address field tests provided in step J for analyzing the loaded statement.

6. The computer aided software engineering process of claim 1 which further includes, a step J, the substeps of:

J1a) determining if the address field does not exceed a predetermined maximum value;

J1b) if the result of stem J1a is:

(J1b1) that the address field exceeds a predetermined maximum value, issuing a warning message and then going to step K;

J1b2) that the address field does not exceed a predetermined maximum value, continuing with any remaining literal address field tests provided in step J for analyzing the loaded statement.

7. The computer aided software engineering process of claim 1 which further includes, in step J, the substeps of:

J2a) determining if the specified operation is a call to another module;

J2b) if the result of step J1a is:

J2b1) that the specified operation is a call to another module, going to step J2c;

J2b2) that the specified operation is not a call to another module, continuing with any remaining literal address field tests provided in step J for analyzing the loaded statement;

J2c) determining the validity of the call;

J2d) if the result of step J2c is:

J2c1) that the call is valid, continuing with any remaining literal address field tests provided in step J for analyzing the loaded statement;

J2c2) that the call is invalid, issuing a warning message and then going to step K.

8. The computer aided software engineering process of claim 1 which further includes, in step J, the substeps of:

J3a) determining if the statement invokes a privileged instruction;

J3b) if the result of step J3a is:

J3b1) that the statement does not invoke a privileged instruction, continuing with any remaining literal address field tests provided in step J) for analyzing the loaded statement;

J3b2) that the statement dose invoke a privileged instruction, going to step J3c;

J3c) determining if intended execution environment permits use of the privileged instruction;

J3c1) if the intended execution environment does not permit use of the privileged instruction, issuing a warning message and going to step K;

j3c2) if the intended execution environment permits use of the privileged instruction, continuing with any remaining literal address field tests provided in step J for analyzing the loaded statement.

* * * * *